Feb. 10, 1953　　　H. D. HERDER ET AL　　　2,628,047
UNIVERSAL MOTOR MOUNTING FOR MACHINE TOOLS
Filed Aug. 19, 1950　　　　　　　　　　　2 SHEETS—SHEET 1

INVENTORS
HARRY D. HERDER
BY WALTER L. VAN DAM

Kenyon & Kenyon
ATTORNEYS

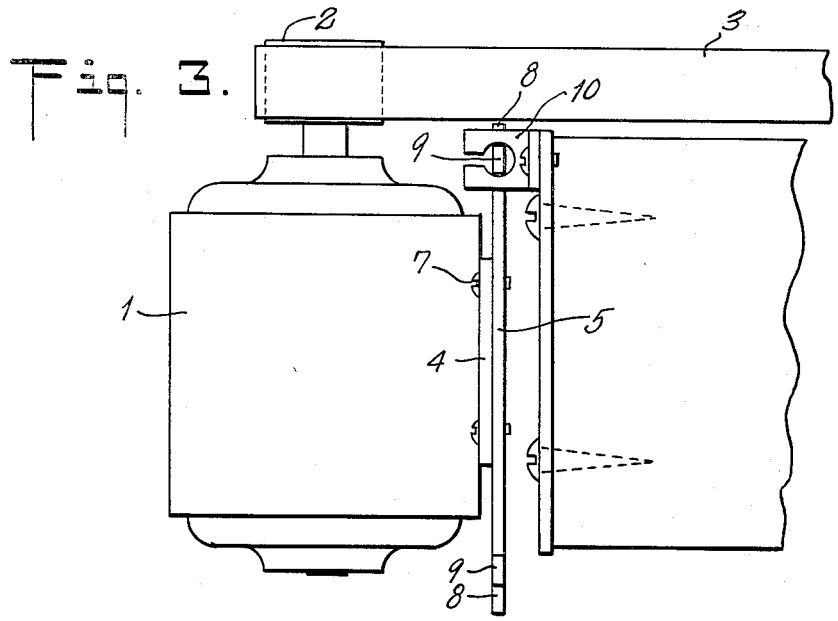
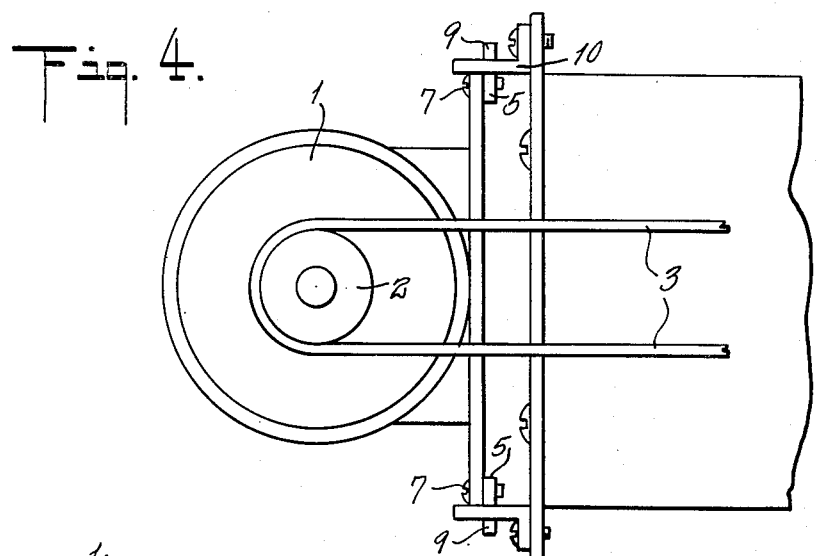
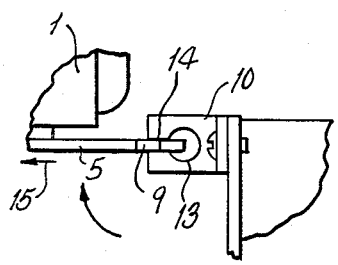

Patented Feb. 10, 1953

2,628,047

UNITED STATES PATENT OFFICE 2,628,047

UNIVERSAL MOTOR MOUNTING FOR MACHINE TOOLS

Harry D. Herder and Walter L. Van Dam, Kalamazoo, Mich., assignors to Atlas Press Company, Kalamazoo, Mich., a corporation of Michigan Application August 19, 1950, Serial No. 180,363

2 Claims. (Cl. 248—23)

This invention relates to motor mounts for use in connection with machine tools.

One of the objects of the invention is to provide such a mount which may be produced easily and inexpensively.

Another object of the invention is to provide such a mount which can be applied to a single motor which may be used on a plurality of machine tools by simply and easily lifting it from one tool to the other.

Another object of the invention is to provide such a mount in which the weight of the motor may be utilized to maintain belt tension when the motor is in place and to take up slack due to minor variations in belt length.

Another object of the invention is to provide such a mount in which the motor is held securely in place when it has been placed in operating position and in which the changing of the motor is accomplished by simply rotating the motor substantially 90° and then lifting it from its mount.

Another object of the invention is to provide such a mount which can be made from simple stampings.

Other objects and advantages of the invention will be apparent from a consideration of the following specification and from the drawings in which:

Fig. 3 is a side elevation of the motor mount employed for mounting a motor with its drive shaft in a vertical position suitable for drill presses or the like;

Fig. 4 is a top plan view of the mount shown in Fig. 4;

Fig. 5 is a partial detailed view showing how the motor may be removed from the mounting.

Figure 1:
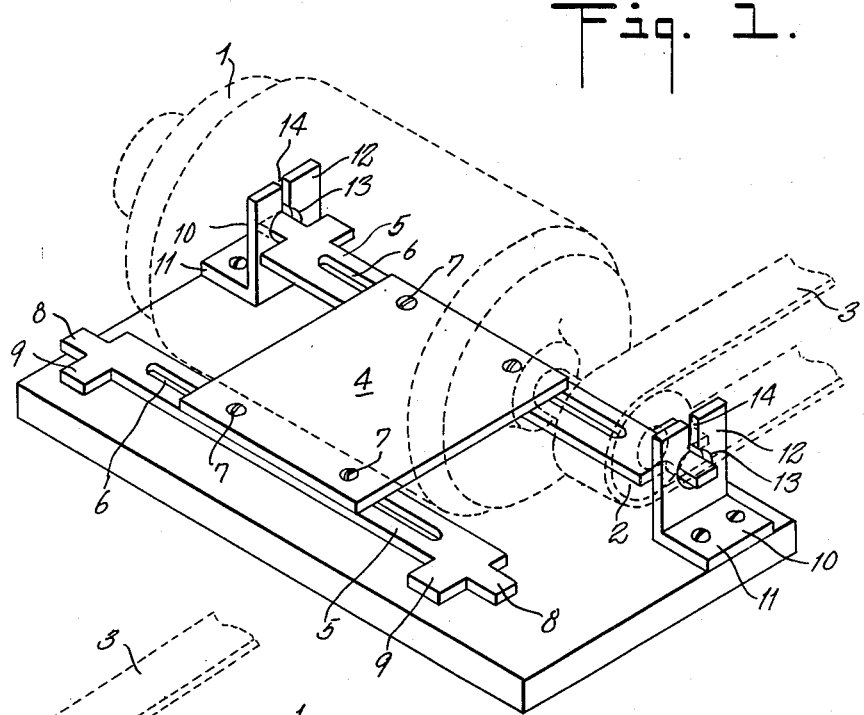
Fig. 1 is a perspective view showing the improved motor mount in use with the motor in operative position for machine tools such as circular saws in which the motor is preferably in position with its drive shaft extending horizontally.
Figure 2:
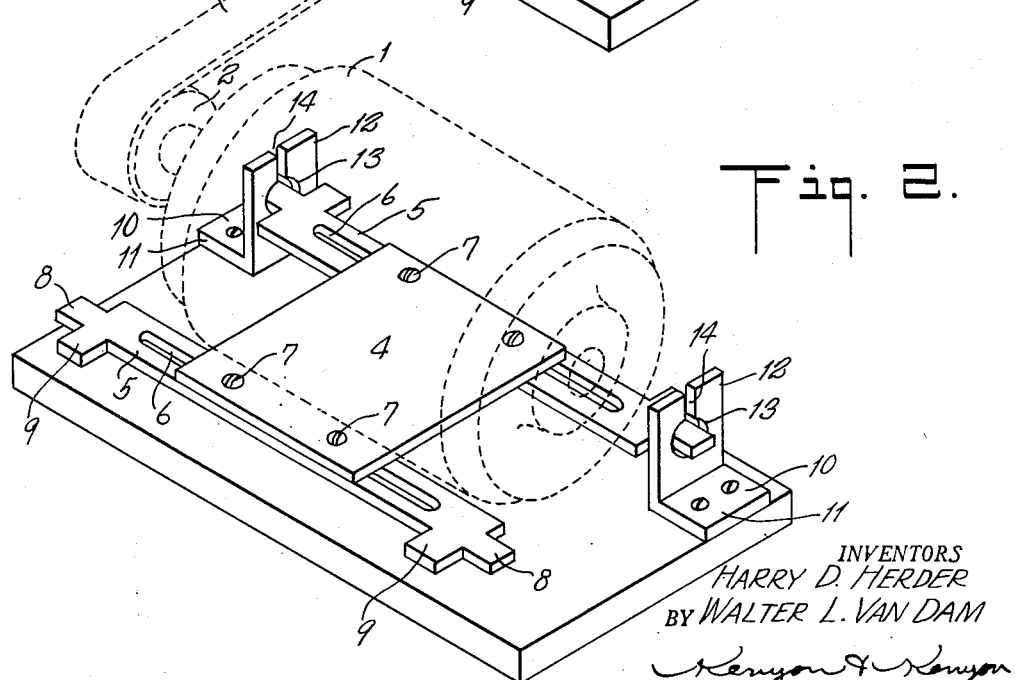
Fig. 2 is a perspective view similar to Fig. 1 showing how the motor mount may be utilized to reverse the motor.

The mounting may be applied to any suitable motor, such as is shown at 1. In Figs. 1 and 2 the motor is shown in dotted lines so as to clearly show how the mount is employed. The motor is provided with a suitable pulley 2 and belt 3 and a base 4.

The motor mount consists of a pair of mounting plates 5 which are made of sheet metal. For ordinary purposes metal about 3/16 of an inch in thickness is satisfactory. The plates are provided with central longitudinal slots 6 to receive bolts 7 for attaching the plates to the base of the motor. Suitable trunnion supports 8 and 9 extend from adjacent corners of each plate 5. They are formed of the same stock that is employed for the plate and are preferably formed by the same blanking operation employed in forming the plate 5. They are preferably rectangular in shape and are of greater width than thickness. For example, using 3/16-inch stock a suitable trunnion may be formed having a width of about 7/8 of an inch and extending from the body of the plate 5 about 9/32 of an inch.

To pivotally support the motor so that its weight can be employed to maintain belt tension and equalize and take care of slight variations in belt length, brackets or mounting bearings 10 are provided. They have a base 11 and a projecting plate, support plate or ear 12. They are preferably formed of the same stock that is employed in making the plates 5 and may likewise be formed by a blanking operation. Centrally of each ear or plate 12 is a circular aperture 13 which has a diameter such that it will receive and fit one of the trunnion members 8 or 9. An access slot 14 is provided in each plate extending from the aperture 13 to an edge of the ear or plate 12. This access slot is narrower than the width of the trunnion members 8 and 9 but is wider than the thickness of these members so as to permit the trunnion members to be inserted into or removed from the circular aperture 13 through the access slot 14 in a manner which is illustrated in Fig. 5. The trunnion member 9 is easily slideable through the access slot 14 so that for removal the motor and mount are swung to a position shown in Fig. 5 presenting the thickness of the trunnion member 9 to the slot 14. It may then easily be removed as indicated by the arrow 15 or may be inserted by a reverse movement. After insertion the motor is swung to operative position and the trunnion is locked in a pivotally supported position so that the motor will not jump from the support in use.

The access slot 14 preferably opens to a side of the plate or ear 12 away from the base 11.

When the motor is used on a circular saw or other machine tool in which the drive shaft of the motor is to be horizontal the supports are positioned as shown in Figs. 1 and 2 and the trunnions 8 are inserted into the apertures 13 as shown in Figs. 1 and 2. When they are rotated to the horizontal position, the motor is pivotally supported so that its weight can exert tension on the belt but the motor is firmly locked in position so that it will not jump out of the support.

If it is desired to reverse the motor, this can be accomplished by simply shifting it to the position shown in Fig. 2. This brings the plate which formerly was not used into use as shown and the drive of the motor is reversed.

If it is desired to use the motor with the drive shaft vertical, the supports, brackets or mounting bearings 10 are mounted as shown in Figs. 4 and 5 with the plates or ears 12 extending horizontally. The trunnion members 9 are then inserted through the slots 14 into the apertures 13 holding the motor in a horizontal position. Thereafter it is swung down to the position shown in Fig. 4. The belt 3 is then placed in position and the weight of the motor swinging about the trunnions 9 serves to tension the belt.

It will be apparent to those skilled in the art that this universal motor mount can be produced very inexpensively using die-forming or blanking operations. Suitable sheet steel may be employed. The motor provided with the mount may be easily shifted from one machine tool to another and once the motor is in position it will not jump out of the mounting.

The preferred form of the invention has been illustrated. However, there is no intention to limit the invention to the single form shown. Other forms embodying the invention may be employed.

What is claimed is:

1. A motor mounting assembly comprising a pair of rectangular flat plates having means for attachment to a motor base and a pair of integral rectangular trunnion members extending at right angles to one another at adjacent corners of the plate, said trunnion members being extensions of the plate and of greater width than thickness, and a pair of mounting bearings, each comprising a support plate having a circular aperture of a diameter to fit the width of a trunnion member and pivotally support the same, and an access slot extending from said circular aperture to an edge of said support plate and having a width greater than the thickness of and less than the width of said trunnion members, whereby said trunnion members may be inserted in said circular apertures through said slots and then rotated to a locked-in, pivotally-supported position.

2. A motor mounting comprising a plate for attachment to a motor base and having a pair of laterally extending rectangular trunnion members, each of greater width than thickness, and a pair of supporting bearing members, each having a projecting plate with a circular aperture therein having a diameter to fit and receive the width of a trunnion member and having an access slot extending from the aperture to the edge of the projecting plate and having a width greater than the thickness of and less than the width of said trunnion members, whereby the trunnion members may be inserted in said apertures and rotated to a locked-in, pivotally-supported position.

HARRY D. HERDER.
WALTER L. VAN DAM.

REFERENCES CITED

The following references are of record in the file of this patent:

UNITED STATES PATENTS

| Number | Name | Date |
|---|---|---|
| 1,445,619 | Jehu | Feb. 13, 1923 |
| 1,573,286 | Whitney | Feb. 16, 1926 |
| 2,102,560 | Kimmich | Dec. 14, 1937 |
| 2,365,467 | Hammerstein | Dec. 19, 1944 |
| 2,418,968 | Crouch | Apr. 15, 1947 |
| 2,601,431 | Christie | June 24, 1952 |